US010613828B2

(12) United States Patent
Paglia et al.

(10) Patent No.: US 10,613,828 B2
(45) Date of Patent: Apr. 7, 2020

(54) DYNAMIC AND PERSONALIZED FILTERING OF MEDIA CONTENT

(71) Applicant: Google LLC, Mountain View, CA (US)

(72) Inventors: Marco Paglia, San Francisco, CA (US); Jokubas Zukerman, San Francisco, CA (US); Owen Daniel Otto, Berkeley, CA (US); Nathan Stuart Streu, San Francisco, CA (US); Rachel Been, San Francisco, CA (US); Eunkyoung Song, Mountain View, CA (US); Bryan Kenneth Rea, San Francisco, CA (US); Brian Armstrong, Cupertino, CA (US)

(73) Assignee: Google LLC, Mountain View, CA (US)

( * ) Notice: Subject to any disclaimer, the term of this patent is extended or adjusted under 35 U.S.C. 154(b) by 430 days.

(21) Appl. No.: 14/252,802

(22) Filed: Apr. 15, 2014

(65) Prior Publication Data

US 2015/0293916 A1    Oct. 15, 2015

(51) Int. Cl.
*G06F 7/00*      (2006.01)
*G06F 7/36*      (2006.01)
*G06F 16/435*    (2019.01)
*G06F 16/335*    (2019.01)

(52) U.S. Cl.
CPC .............. *G06F 7/36* (2013.01); *G06F 16/435* (2019.01); *G06F 16/335* (2019.01)

(58) Field of Classification Search
CPC ........................... G06F 17/3089; G06F 16/335
USPC ................................................. 707/754, 758
See application file for complete search history.

(56) References Cited

U.S. PATENT DOCUMENTS

| 6,341,280 | B1* | 1/2002 | Glass | G06F 16/10 |
| | | | | 707/754 |
| 7,293,275 | B1 | 11/2007 | Krieger et al. | |
| 7,792,821 | B2 | 9/2010 | Shakib et al. | |
| 7,962,478 | B2 | 6/2011 | Garbow et al. | |
| 8,131,784 | B1* | 3/2012 | Zhuge | G06F 16/113 |
| | | | | 707/823 |
| 8,583,673 | B2 | 11/2013 | Tarek et al. | |
| 9,489,400 | B1* | 11/2016 | Haitani | G06F 16/583 |
| 2004/0220893 | A1* | 11/2004 | Spivack | G06F 9/4443 |
| | | | | 706/46 |
| 2010/0079781 | A1* | 4/2010 | Yamamoto | H04N 1/2179 |
| | | | | 358/1.13 |
| 2010/0281047 | A1* | 11/2010 | Danninger | G06F 3/0482 |
| | | | | 707/769 |

(Continued)

*Primary Examiner* — Eliyah S. Harper
(74) *Attorney, Agent, or Firm* — Shumaker & Sieffert, P.A.

(57) ABSTRACT

The present disclosure provides techniques for creating a filter for a set of content items based on a common attribute identified in the set of content items and a user history. A method may include obtaining a plurality of content item identifiers. One or more common attributes associated with each of a plurality of content items may be identified and each of the plurality of content items may be identified by one of the plurality of content item identifiers. A first filter may be created based on a first attribute from among the one or more common attributes and a user history. Next, a first user interface may be displayed comprising the first filter and the plurality of content item identifiers. The first filter may be displayed among the plurality of content item identifiers and may have the same visual format as one of the content item identifiers.

17 Claims, 3 Drawing Sheets

(56) References Cited

U.S. PATENT DOCUMENTS

| | | | |
|---|---|---|---|
| 2011/0055203 A1* | 3/2011 | Gutt | G06F 3/04815 |
| | | | 707/722 |
| 2012/0102062 A1* | 4/2012 | Gurnani | G06Q 30/0601 |
| | | | 707/769 |
| 2012/0109984 A1* | 5/2012 | Clark, Jr. | G06F 16/248 |
| | | | 707/754 |
| 2013/0339343 A1 | 12/2013 | Hierons et al. | |
| 2015/0293916 A1* | 10/2015 | Paglia | G06F 16/435 |
| | | | 707/740 |
| 2016/0125498 A1* | 5/2016 | Setty | G06F 16/23 |
| | | | 705/26.63 |
| 2017/0052652 A1* | 2/2017 | Denton | G06F 3/0481 |
| 2019/0102425 A1* | 4/2019 | Obeidat | G06F 16/2428 |

* cited by examiner

DYNAMIC AND PERSONALIZED FILTERING OF MEDIA CONTENT

BACKGROUND

Finding desirable media content (e.g., movies, books, applications, videos, music, videos, search results, etc.) can be difficult for a user. For instance, within a media service, a user may search for "action movies" or browse movies in the "action" category. Typically, search results presented in response to the query or within the "action" category may be a large set of movies that satisfy the search query or are in the category. Some services may also provide a set of filters that allow the user to refine search results or filter the display of content such as by price, date, rating, etc.; however, these types of filters are typically static and are not relevant to the search results or the particular content being displayed. In addition, these filters may not be specific to the user who performed the search.

BRIEF SUMMARY

According to an embodiment of the disclosed subject matter a method may include obtaining a plurality of content item identifiers. One or more common attributes associated with each of a plurality of content items may be identified and each of the plurality of content items may be identified by one of the plurality of content item identifiers. A first filter may be created based on a first attribute from among the one or more common attributes and a user history. Next, a first user interface may be displayed comprising the first filter and the plurality of content item identifiers. The first filter may be displayed among the plurality of content item identifiers and may have the same visual format as one of the content item identifiers.

An implementation of the disclosed subject matter provides a system including a processor configured to obtain a plurality of content item identifiers. One or more common attributes associated with each of a plurality of content items may be identified and each of the plurality of content items may be identified by one of the plurality of content item identifiers. Next, a first filter may be created based on a first attribute from among the one or more common attributes and a user history. A first user interface may be displayed comprising the first filter and the plurality of content item identifiers and the first filter may be displayed among the plurality of content item identifiers and may have the same visual format as one of the content item identifiers.

In an implementation, a system according to the disclosed subject matter includes means for obtaining a plurality of content item identifiers and means for identifying one or more common attributes associated with each of a plurality of content items, each of the plurality of content items being identified by one of the plurality of content item identifiers. The system may further include means for creating a first filter based on a first attribute from among the one or more common attributes and a user history. Additionally, the system may further include means for displaying a first user interface comprising the first filter and the plurality of content item identifiers, wherein the first filter is displayed among the plurality of content item identifiers and has the same visual format as one of the content item identifiers.

Implementations of the disclosed subject matter provide techniques for creating one or more filters for a set of content items based on one or more common attributes identified in the set of content items and a user history. The one or more created filters may be displayed among the set of content items, and may appear in the same visual format as one of the content items while a user navigates through the set of content items. This technique may create contextual filters based on the set of content items and may be personalized based on a user history associated with a user. In addition, this technique may improve the configuration of a user interface displaying the one or more created filters and the set of content items. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Finding desirable media content (e.g., movies, books, applications, music, videos, search results, etc.) can be difficult for a user. For instance, within a media service, a user may search for "action movies" or browse movies in the "action" category. Typically, search results presented in response to the query or within the "action" category may be a large set of movies that satisfy the search query or are in the "action" category. Some services may also provide a set of filters that allow the user to refine search results or filter the display of content such as by price, date, rating, etc.; however, these types of filters are typically static and are not relevant to the search results or the particular content being displayed. In addition, these filters may not be customized to the user who performed the search or is browsing for content.

The present disclosure provides a technique for creating one or more filters for a set of content items based on one or more common attributes identified in the set of content items and a user history associated with a user. For example, multiple content items in a set, such as a set of movies, may be associated with a common attribute, such as a particular actor. In addition, a user history associated with a user may indicate that the user has previously watched movies including the same actor. As a result, a filter may be created allowing the user to filter the set of content items based on the particular actor, thereby only displaying those content items with which the particular actor is associated. Accordingly, one or more filters may be created which are contextual to the set of content items and also personally relevant to a user. In particular, created filters may vary from user to user depending upon the particular set of content items being displayed and the user history associated with each user. A common attribute identified among multiple content items may be any feature, quality, characteristic, identifier, entity, and the like, associated with one or more content items among multiple content items. Additionally, display of the created filters may be integrated within the display of the set of content items, and may appear in the same visual format as each of the content items, such that while a user navigates or scrolls through the set of content items, the created filter(s) may appear in-line with the content items.

As an example, while using a content service, a user may search for "adventure movies" and the system may identify a set of movies, e.g., 50 movies that satisfy the search query. A content service may be any service, such as, for example, a website or an application, that a user may use to search for, browse, identify, activate (e.g., play, view, display, etc.), and/or receive content from a content provider. Based on the set of 50 movies, the system may identify one or more common attributes associated with the movies, and may determine that the actor Brad Pitt is associated with 6 of these movies. In addition, the system may obtain a user history associated with the user, and based on the user history, the system may determine that the user has purchased one or more movies associated with the actor Brad Pitt. As a result, a filter for "movies with Brad Pitt" may be created and presented to the user along with the set of 50 movies. If the user selects the created filter "movies with Brad Pitt", only the 6 movies that include Brad Pitt may be displayed to the user. Instead of statically displaying a set of standard filters only those filters which are contextual to the displayed content items and a user history may be created and displayed. For example, if none of the movies in a set of movies is a horror movie, a filter for horror movies may not be created and/or displayed.

As another example, while using a content service, a user may search for "cooking application". The system may identify a set of 26 applications that satisfy the search query "cooking application." Among the set of 26 applications, the system may determine that 8 of the applications are particularly popular in a geographic area associated with the user. As a result, a filter may be created such as "popular in your area". By selecting this filter, only the 8 applications that are popular in the user's geographic area would be displayed.

In addition to creating a filter based on a common attribute and a user history, the present disclosure includes displaying a user interface that includes a set of content items and a created filter. In particular, the created filter may be displayed in the same visual format as one of the content items. Rather than always displaying the created filter at the same location in a user interface, the created filter may be embedded among the displayed content items so that as the user scrolls through the content items, the one or more created filters may appear in-line among the content items. As a result, exploring and browsing content items may be more immersive and enjoyable for a user and filtering content items may require less interaction and navigation by the user of the user interface.

Figure 1:
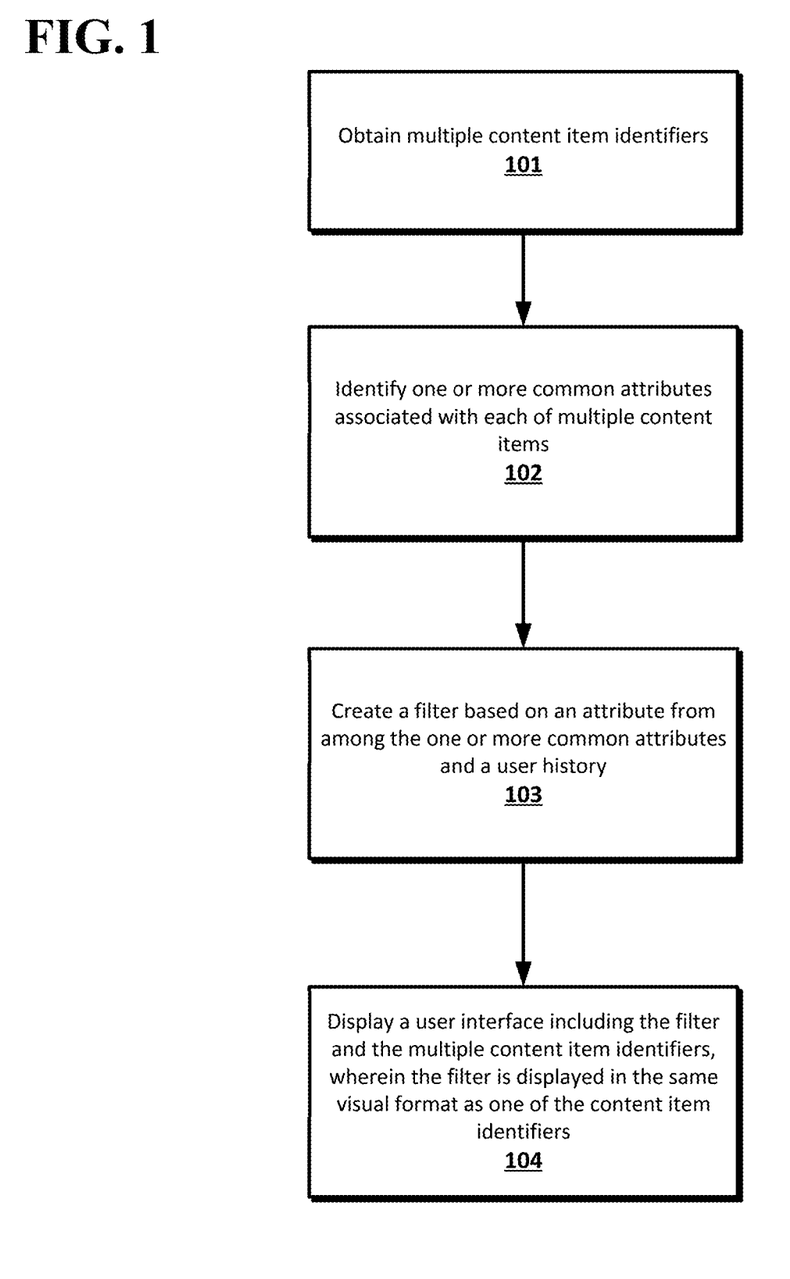
FIG. 1 shows an example process according to an implementation of the disclosed subject matter.

FIG. 1 shows an example process according to an implementation of the disclosed subject matter. As shown multiple content item identifiers may be obtained, at 101. A content item identifier may identify a content item and may be in any suitable format for identifying a content item. A content item may be of a content-type such as a media item, a movie, a book, a song, an album, a magazine, a show, a video, an application, a product, a website, and the like. A content item identifier may be, for example, an image, a graphic, an icon, a link, an action item, a clip, text, and the like. In most cases, a content identifier could be any visual depiction that is easily identifiable to a user as identifying a content item. As an example, a content item identifier that identifies a content item such as a song may be an image associated with the song, the album cover associated with the song, album artwork associated with the song, an image of the artist of the song, an option to play an audio clip of the song, and the like. As another example, a content item identifier that identifies a content item such as a game may be an icon associated with the game, a link to purchase the game, an action item associated with the game such as an option to add the game to the user's cart or wish list, and the like. An action item may also include an option to activate a content item such as play or view the media item.

Multiple content items may be identified by multiple content item identifiers. In some cases, the content items identified may be based on a search query received from a user. In other cases, each of the multiple content items may be associated with the same category of content. A category of content may be any category in which content may be categorized such as new releases, recently purchased content, recently previewed content, recommended content, a library of content, a list of content (e.g., a playlist), an album, an artist, a radio station, a genre, an actor, a type of content (e.g., movies, books, songs, albums, magazines, shows, videos, applications, products, websites, etc.) and the like. In some cases, the multiple content item identifiers may identify content items in more than one category of content and of more than one content-type.

Referring back to FIG. 1, at 102, one or more common attributes associated with each of multiple content items may be identified, and each content item may be identified by one content item identifier. In some cases, the number of content items associated with a particular common attribute may be less than the number of content item identifiers being displayed in a user interface. For example, 10 content item identifiers identifying 10 content items may be displayed in a user interface, such as 10 movies. Among the 10 movies, only 4 movies may be associated with the specific common attribute of Brad Pitt as an actor. In this case, the number of movies associated with the common attribute of Brad Pitt, i.e., 4, is less than the number of content item identifiers, i.e., 10, being displayed in the user interface. An attribute of a content item may be any quality, characteristic, entity, and the like that may be associated with a content item. For example, attributes associated with the song Blanket may be an artist, an album, a price of the song or the album associated with song, the genre associated with the song, a release date of the song, a rating of the song, a producer of the song, an award associated with the song, a geographic region in which the song is popular, a social media characteristic of the song, and the like. In general, a content item may be associated with any number of attributes. One or more common attributes associated with multiple content items may be identified by determining that the multiple content items are associated with the same attribute(s). As in the example above, each of the 10 movies may be associated with multiple attributes. A common attribute of Brad Pitt as an actor may be associated with 4 of the movies, a common attribute of the release date of 2013 may be associated with 2 of the movies, and a common attribute of receiving an Oscar award may be associated with 3 of the movies, etc.

Following identification of one or more common attributes associated with multiple content items, a filter may be created based on an attribute from among the one or more common attributes and a user history, at 103. In addition, for example, a second filter may be created based on a second attribute from among the one or more common attributes and the user history. A user history associated with a user may be based on one or multiple sources of user history associated with a user. A source of user history for a user may be any source of information regarding a user's previous activity. Examples of sources of user history associated with a user may be a content library of the user, content preferences of the user, a content viewing history of the user, a content listening history of the user from a content service provider, a purchase history of the user from one or more retailers, a webpage viewing history of the user, a conversion history of the user based on previously presented purchasable content, a purchasable content viewing history of the user, an ad selection history of the user, a social media activity of the user, and the like. As an example, a user's content library may include a particular song that the user may have previously purchased. Accordingly, this information may be included in a user history associated with the user such that a filter may be created for content items associated with the same artist. User history for a user may be collected from multiple different sources, such as from a content provider, an online retailer, an internet search provider, a video sharing site, a website, a social network, and the like. Alternatively or in addition, various techniques may be used to identify a user history associated with a user from various sources of user history such that a filter may be created based on a common attribute identified among multiple content items and a user history.

In general, because filters are created based on a common attribute identified among content items and a user history, the number of filters that may be created for a set of multiple content items may be infinite. For example, a user may be browsing content items such as applications. One or more filters may be created based on one or more common attributes identified among the applications and the user's history. Examples of filters that may be created when browsing applications may include filter types such as suitable for kids, cooking applications, games for playing in a short period of time, games for playing over a long period of time, popular applications in your area, popular applications in NY, etc. In addition, the filters created may be unique to each content browsing session since the content items displayed during each browsing session may be different according to the category of content that is being browsed or the particular search query received from a user. Additionally, the created filters may be different for each user since the user's history is taken into account when creating the filter. This technique may result in creation of one or more filters that are contextual to multiple content items being displayed in an interface and personal to a user according to the user's history, which may increase a user's ability to identify desirable content.

Returning to FIG. 1, a user interface may be displayed that includes the created filter and the multiple content item identifiers, at 104. In particular, the filter may be displayed among the multiple content item identifiers and may have the same visual format as one of the content item identifiers. In cases in which more than one filter is created, the user interface may further include the additional filter(s), the additional filter(s) may be displayed among the multiple content item identifiers and may have the same visual format as one of the content item identifiers. Rather than presenting content items and created filters in a static list format to a user, a user interface may display a created filter in-line with multiple content item identifiers such that the created filter appears to be integrated among the multiple content item identifiers. As an example, a user interface as described herein may be a scrollable interface that may display multiple content item identifiers and created filters and which may be navigable by a user by scrolling up and/or down, such as by using a touch screen device. According to an implementation, a scrollable user interface may display a first filter prior to second filter such that the first filter may be displayed before the second filter as a user scrolls through the interface from top to bottom. By embedding filters among multiple content item identifiers and displaying content item identifiers and created filters in the same visual format, exploring multiple content items may be more enjoyable for a user and may feel more immersive by not requiring as much interaction by a user, as the user may not have to repeatedly navigate to the static location of a set of standard filters.

In addition, the user interface as described herein may be more aesthetically pleasing to a user since the content item identifiers and created filters may be displayed in the same visual format. The visual format of each of a content item identifier and a created filter may be any format suitable for display in a portion and/or section of a user interface. For example, a visual format may be a defined visual area, region and/or shape that may include any one or a combination of a content item identifier, a created filter, an image, text, a label, information associated with a created filter, and the like.

Figure 2:
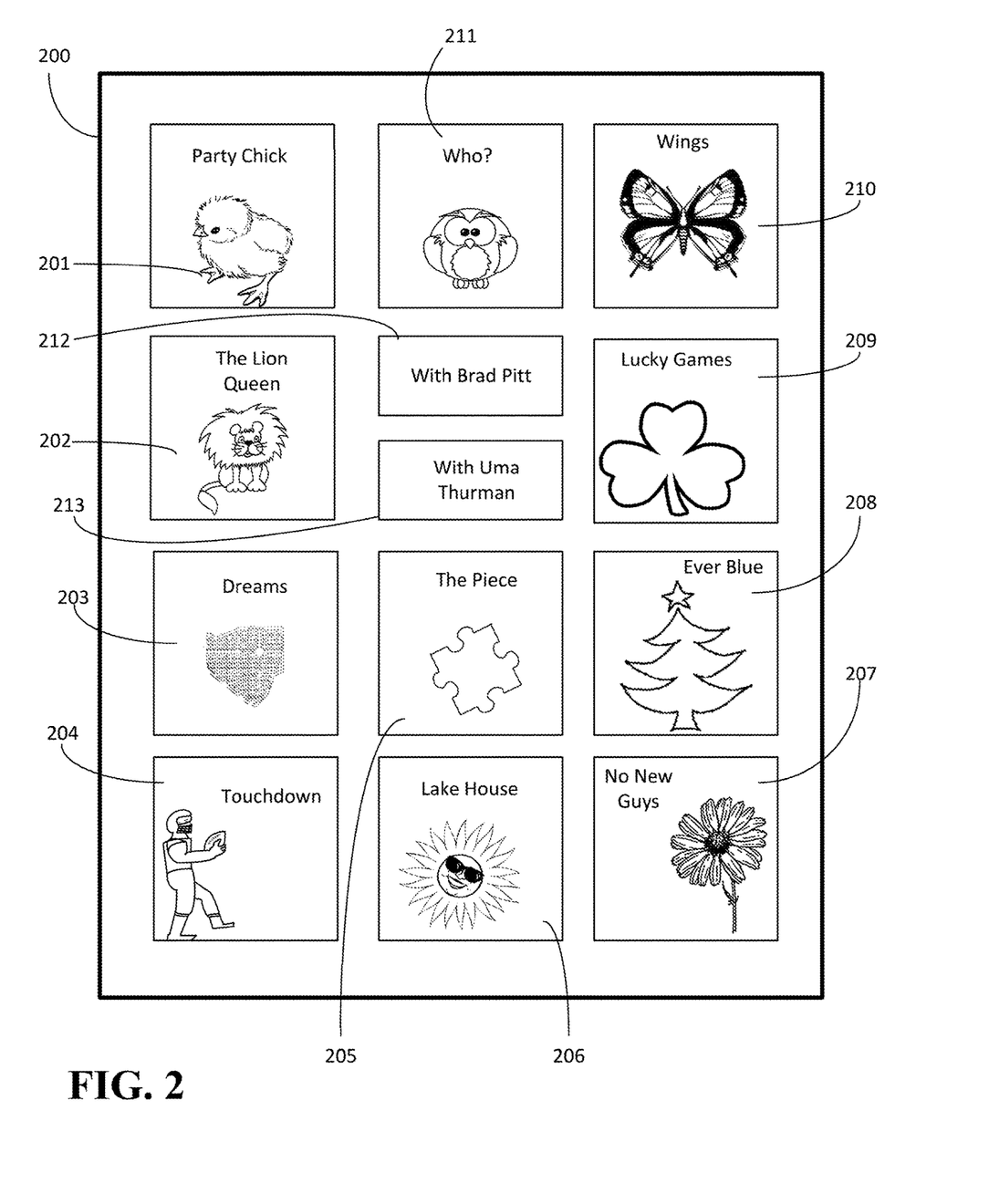
FIG. 2 shows an example user interface arrangement according to an implementation of the disclosed subject matter.

FIG. 2 shows an example user interface arrangement according to an implementation of the disclosed subject matter. A user may perform a search for adventure movies and the results of the search may be included in the user interface shown in FIG. 2. As shown, a user interface 200 may include multiple content item identifiers 201, 202, 203, 204, 205, 206, 207, 208, 209, 210, and 211. Each content item identifier 201, 202, 203, 204, 205, 206, 207, 208, 209, 210, and 211 may identify a content item. For example, content item identifier 201 may identify a content item, i.e., the movie Party Chick, content item identifier 202 may identify a content item, i.e., the movie The Lion Queen, content item identifier 203 may identify a content item, i.e., the movie Dreams, content item identifier 204 may identify a content item, i.e., the movie Touchdown, and so on such that each of the other content item identifiers 205, 206, 207, 208, 209, 210, and 211 may identify a content item, as shown. One or more common attributes associated with the content items, which are identified by the content item identifiers 201, 202, 203, 204, 205, 206, 207, 208, 209, 210, and 211, may be identified. For example, the common attribute of Brad Pitt may be associated with multiple content items, such as the movies Who?, Lucky Games, and Touchdown, identified by the content item identifiers 211, 209, and 204, respectively. In addition, a user history associated with the user may indicate that the user has previously viewed movies associated with Brad Pitt. As a result, a filter 212 may be created based on the identified common attribute of Brad Pitt and the user history indicating the user's preference for movies associated with Brad Pitt. The user interface 200 may be displayed and may include the filter 212 for Brad Pitt and the content item identifiers 201, 202, 203, 204, 205, 206, 207, 208, 209, 210, and 211. As shown, the filter 212 for Brad Pitt may be displayed in the same visual format as one of the content item identifiers. In particular, the user interface 200 may display the created filter 212 in-line with the multiple content item identifiers 201, 202, 203, 204, 205, 206, 207, 208, 209, 210, and 211 such that the created filter 212 appears to be integrated among multiple content item identifiers. Although not shown, filter 212 may also include an image, e.g., an image of Brad Pitt, text, a label, information associated with a created filter, and the like.

Multiple filters may be created for a set of content items. For example, a second common attribute of Uma Thurman may be associated with multiple content items, such as the movies Party Chick and Dreams, identified by the content item identifiers 201 and 203, respectively. Additionally, the user history associated with the user may indicate that the user previously provided social media input associated with Uma Thurman, for example, the user may have shared a movie associated with Uma Thurman with a friend via a social network. As a result, a filter 213 may be created based on the identified common attribute of Uma Thurman and the user history indicating the user's past sharing of a movie associated with Uma Thurman. As shown, the user interface 200 may also include the filter 213 for Uma Thurman, which may also be displayed in the same visual format as one of the content item identifiers. According to an implementation, both of the filters 212 and 213 may be displayed in the same visual area equivalent to the visual area required by one of the content item identifiers. For example, as shown, the filters 212 and 213 may be displayed in the same visual area (e.g., the same size, shape, area, etc.) equivalent to the visual area required by, for example, any one of the content item identifiers 201, 202, 203, 204, 205, 206, 207, 208, 209, 210, and 211. Alternatively, a single filter may be displayed in the same visual area equivalent to the visual area required by any one or multiple of the content item identifiers.

Although filter 212 is displayed in a position above filter 213 in the user interface 200, in some cases, placement of each of the filters 212 and 213 may be random and each may be located in any location among the content item identifiers 201, 202, 203, 204, 205, 206, 207, 208, 209, 210, and 211 within the user interface 200. According to an implementation, a first filter may be displayed either above a second filter or to the left of the second filter and horizontally aligned with the second filter. For example, filter 212 may be displayed at any location in-line with the content item identifiers 201, 211, and 210, i.e., above filter 213. As another example, filter 212 may be displayed to the left of filter 213, for instance at the location where the content item identifier 202 is displayed, in which case, content item identifier 202 may be displayed at a different location in the user interface 200.

In some cases in which multiple filters are created and displayed in a user interface, display of each of the filters relative to the other filters may be prioritized according to various techniques. According to an implementation, a first and second filter may be displayed among the multiple content item identifiers according to priorities assigned to each of the first and second filters. In some cases, a created filter may not be displayed in a static location but rather can change positions based on the importance of the filter to the content items and/or to the other created filters. As an example, among the content items displayed in FIG. 2, multiple filters may be created according to the techniques described herein. These created filters may include Brad Pitt, Uma Thurman, Christopher Nolan, and Steven Spielberg. In some cases, the importance of a filter may be defined by the type of filter. For example, a filter for an actor associated with a content item may be prioritized over a filter for a director associated with a content item. In this case, the created filters for Brad Pitt and Uma Thurman may be prioritized over the created filters for Christopher Nolan and Steven Spielberg. As such, the created filters for Brad Pitt and Uma Thurman may be displayed before (e.g., above or to the left of) the created filters for Christopher Nolan and Steven Spielberg. As another example, display of created filters may be prioritized based on the number of content items associated with the created filter and/or based on the popularity of the created filter in a category of content items. For example, among the content items displayed in user interface 200, the common attribute of Brad Pitt may be associated with 3 content items and Uma Thurman may be associated with 2 content items. As a result, since the number of content items associated with Brad Pitt is greater than the number of content items associated with Uma Thurman, a filter created for Brad Pitt may be prioritized relative to the filter created for Uma Thurman. As another example, if within the "Adventure Movies" category of content items movies directed by Christopher Nolan are more popular than movies directed by Steven Spielberg, the filter created for Christopher Nolan may be prioritized relative to the filter created for Steven Spielberg. As yet another example, within the movies category of content items, a filter for an actor may be a more popular filter type than a filter for director of a movie, as such, a created filter for an actor may be prioritized relative to a filter for a director of a movie. Prioritization of created filters may be based on a user setting, a default setting, a system setting, and the like.

One or more filters displayed in a user interface may be selected at any time while the user interface is being displayed. According to an implementation, an indication may be received of a selection of a filter, and as a result, a second user interface may be displayed. The second user interface may include a first portion of the multiple content item identifiers identifying a first portion of the multiple content items associated with an attribute and the user history. Referring back to FIG. 2, an indication of a selection of the Brad Pitt filter 212 may be received and the content items may be filtered accordingly. As a result, a second user interface (not shown) may be displayed which includes only the content item identifiers 211, 209, and 204 identifying the movies Who?, Lucky Games, and Touchdown, respectively, associated with the common attribute of Brad Pitt. In this case, an additional filter may be created based on the content items Who?, Lucky Games, and Touchdown, and the user history associated with the user. According to an implementation, one or more common attributes associated with each of the first portion of the multiple content items, and a filter may be created based on an attribute from among the one or more common attributes associated with each of the first portion of the multiple content items. For example, among the content items Who?, Lucky Games, and Touchdown, a common attribute of being a new release may be associated with the content items Who? and Touchdown. In addition, a user history associated with the user may indicate that the user has recently viewed movies which are new releases. As a result, a filter may be created for new releases and the second user interface may include this new releases filter. Accordingly, the displayed second user interface may include the new releases filter and the content item identifiers 211, 209, and 204 identifying the movies Who?, Lucky Games, and Touchdown, respectively. Further, if an indication of selection of the new releases filter is received, the content items Who?, Lucky Games, and Touchdown would be filtered such that the user interface would display the content items which are new releases, i.e., Who? and Touchdown.

Figure 3:
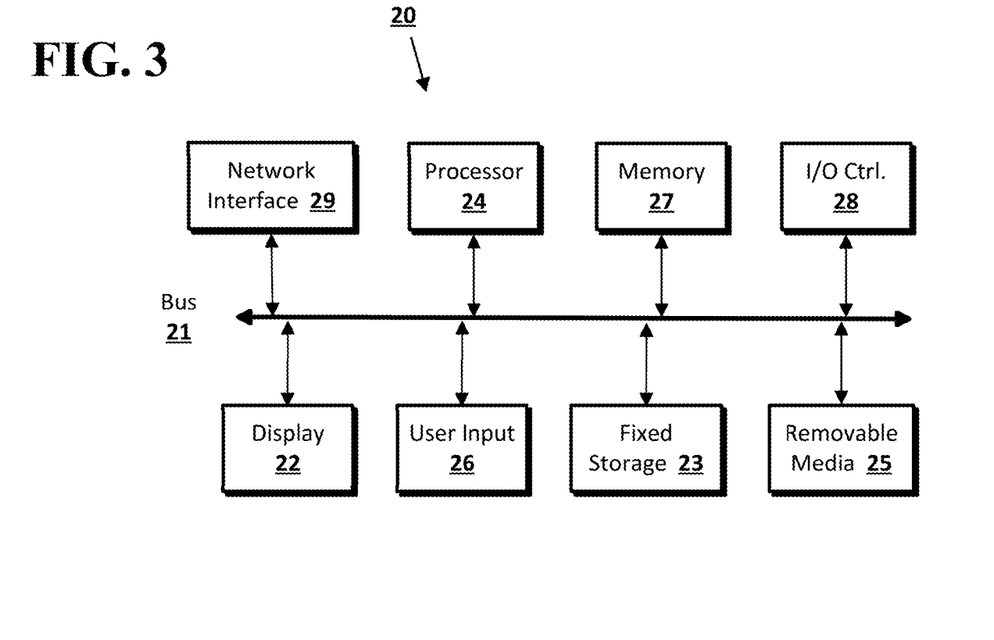
FIG. 3 shows a computer according to an embodiment of the disclosed subject matter.

Embodiments of the presently disclosed subject matter may be implemented in and used with a variety of component and network architectures. FIG. 3 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 4.

Many other devices or components (not shown) may be connected in a similar manner, such as document scanners, digital cameras, auxiliary, supplemental, or backup systems, or the like. Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 4:
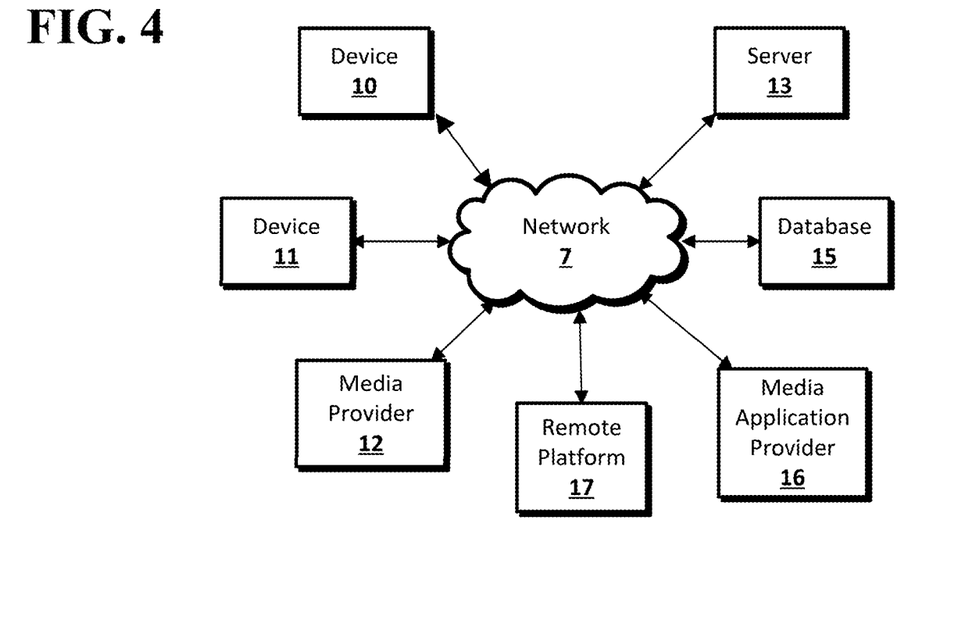
FIG. 4 shows a network configuration according to an embodiment of the disclosed subject matter.

FIG. 4 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for reducing user inputs required to find information by dynamically generating filters, the method comprising:
receiving, by a computing system and from a computing device of a user, a search request specifying content for which the user is searching; and
responsive to receiving the search request:
identifying, by the computing system and based on the search request, a plurality of content items that satisfy the search request, wherein each content item from the plurality of content items is associated with a respective set of attributes;
identifying, by the computing system and based on the respective set of attributes for each of the plurality of content items, one or more common attributes that each of the plurality of content items have in common;
identifying, by the computing system, one or more historical common attributes in a user history for the user, wherein the user history includes respective user histories from two or more different sources, and wherein each of the respective user histories includes one or more of a geographic location of the user or previous user actions associated with the one or more common attributes;
predicting, by the computing system and based on the one or more historical common attributes, a subset of the one or more common attributes as being relevant to the user;
dynamically generating, by the computing system and based on the subset of the one or more common attributes, at least one filter;
outputting, by the computing system and for display by the computing device of the user, information about at least a portion of the plurality of content items and the at least one filter, wherein the at least one filter has the same visual format as the information about at least the portion of the plurality of content items;
receiving, by the computing system and from the computing device of the user, a selection of a filter from the at least one filter; and
responsive to receiving the selection of the filter:
determining, by the computing system and based on the filter, a subset of the plurality of content items; and
outputting, by the computing system and for display by the computing device of the user, information about at least a portion of the subset of the plurality of content items.

2. The method of claim 1, wherein the at least one filter includes a first filter and a second filter.

3. The method of claim 2, wherein outputting information about at least a portion of the plurality of content items and the at least one filter includes outputting the first filter and the second filter, wherein the second filter has the same visual format as the information about at least the portion of the plurality of content items.

4. The method of claim 3, wherein the first filter is positioned either above the second filter or to the left of the second filter and horizontally aligned with the second filter.

5. The method of claim 3, wherein the first and second filters are positioned among the information about at least the portion of the plurality of content items according to priorities assigned to each of the first and second filters.

6. The method of claim 3, wherein the first and second filters are positioned in the same visual area equivalent to the visual area required by information about one content item from the portion of the plurality of content items.

7. The method of claim 1, wherein each of the plurality of content items are associated with a same category of content.

8. The method of claim 1, wherein each of the plurality of content items is of a content-type selected from the group consisting of: a movie, a book, a song, an album, a magazine, a show, a video, an application, a product, and a website.

9. A system for reducing user inputs required to find information by dynamically generating filters, the system comprising:
a processor configured to:
receive, from a computing device of a user, a search request specifying content for which the user is searching; and
responsive to receiving the search request:
identify, based on the search request, a plurality of content items that satisfy the search request, wherein each content item from the plurality of content items is associated with a respective set of attributes;
identify, based on the respective set of attributes for each of the plurality of content items, one or more common attributes that each of the plurality of content items have in common;
identify one or more historical common attributes in a user history for the user, wherein the user history includes respective user histories from two or more different sources, and wherein each of the respective user histories includes one or more of a geographic location of the user or previous user actions associated with the one or more common attributes;
predict, based on the one or more historical common attributes, a subset of the one or more common attributes as being relevant to the user;
dynamically generate, based on the subset of the one or more common attributes, at least one filter;
output, for display by the computing device of the user, a user interface that includes information about at least a portion of the plurality of content items and the at least one filter, wherein the at least one filter has the same visual format as the information about at least the portion of the plurality of content items;
receive, from the computing device of the user, a selection of a filter from the at least one filter; and
responsive to receiving the selection of the filter:
determine, based on the filter, a subset of the plurality of content items; and
output, for display by the computing device of the user, an updated user interface that includes information about at least a portion of the subset of the plurality of content items.

10. The system of claim 9, wherein the at least filter includes a first filter and a second filter.

11. The system of claim 10, wherein the first user interface further includes the second filter, wherein the second filter has the same visual format as the information about at least the portion of the plurality of content items.

12. The system of claim 11, wherein the first filter is positioned either above the second filter or to the left of the second filter and horizontally aligned with the second filter.

13. The system of claim 11, wherein the first and second filters are positioned among the information about at least the portion of the plurality of content items according to priorities assigned to each of the first and second filters.

14. The system of claim 11, wherein the first and second filters are positioned in the same visual area equivalent to the visual area required by information about one content item from the portion of the plurality of content items.

15. The system of claim 9, wherein each of the plurality of content items are associated with a same category of content.

16. The system of claim 9, wherein each of the plurality of content items is of a content-type selected from the group consisting of: a movie, a book, a song, an album, a magazine, a show, a video, an application, a product, and a website.

17. The method of claim 1, wherein each of the respective user histories further includes data from one or more of: a content library of the user, a content viewing history of the user, a content listening history of the user from a content service provider, a purchase history of the user from one or more retailers, a webpage viewing history of the user, a conversion history of the user based on previously presented purchasable content, a purchasable content viewing history of the user, an ad selection history of the user, and a social media activity of the user.

* * * * *